June 9, 1953     W. E. SCHMERTZ     2,641,456
HEAT RECOVERY APPARATUS

Filed Dec. 22, 1949     2 Sheets-Sheet 1

*INVENTOR.*
WILLIAM E. SCHMERTZ.
BY Christy, Parmelee & Strickland
ATTORNEYS.

June 9, 1953  W. E. SCHMERTZ  2,641,456
HEAT RECOVERY APPARATUS
Filed Dec. 22, 1949  2 Sheets-Sheet 2

INVENTOR.
WILLIAM E. SCHMERTZ.
BY
Christy, Parmelee & Strickland
ATTORNEYS

Patented June 9, 1953

2,641,456

UNITED STATES PATENT OFFICE 2,641,456

HEAT RECOVERY APPARATUS

William E. Schmertz, Pittsburgh, Pa.

Application December 22, 1949, Serial No. 134,476

1 Claim. (Cl. 263—15)

This invention relates to heat recovery apparatus for recovering heat from and reducing the temperature of exhaust flue gases, and more particularly, to a novel arrangement of apparatus providing special advantages when utilized as a part of a regenerator structure on open-hearth furnaces, for example.

In furnace structures generally, it is desirable to utilize the heat of the burning products of combustion as fully as possible, and to this end, efficient furnace design is directed toward holding the exhaust flue gases to as low a temperature as possible. Open-hearth furnaces furnish a good example of furnace structures in which considerable effort and equipment is directed toward reducing the temperature of the exhaust flue gases through the use of complicated regenerator structures. The gas ports at opposite ends of an open-hearth furnace are connected with regenerator chambers having a considerable quantity of brick checker-work therein to provide a large area of heat absorbing surfaces. The combustible gases which are fed to the furnace are heated by being passed through one regenerator chamber, and the burning products of combustion are exhausted from another portion of the furnace and are passed through another regenerator chamber and operate to transfer heat to the brick checker-work of that regenerator chamber. At appropriate intervals, usually of the order of fifteen minutes, the flow of the products of combustion through the open-hearth furnace is reversed, and in this manner, the brick checker-work in the regenerator which has been heated by the products of combustion is made to give up its heat to the gas being delivered to the furnace for supporting combustion therein. This arrangement conserves heat and enables a higher temperature to be obtained in the open-hearth. Although the heat saved is considerable and justifies the expense and complexity of the generator structure yet in existing structures the flow of gases escaping to the stack have a higher temperature than is desirable and much heat is carried away by the flow of gases being exhausted.

One of the principal objects of this invention is to provide a novel apparatus for utilizing the heat of escaping flue gases. Although the apparatus of this invention is useable in any furnace structure from which the products of combustion are carried away through an exhaust flue, the invention is particularly adapted for use in connection with the regenerator of open-hearth furnaces. As will be pointed out in greater detail hereinafter, the apparatus of this invention, in absorbing heat from the exhaust gases of the open-hearth furnace and in radiating such heat back into the regenerator, improves the operation of and increases the efficiency of the regenerator without requiring any change in its structure.

A more specific object of this invention is to provide a heat conserving unit which may be placed in an exhaust flue directly in the path of the products of combustion being exhausted so that it will be heated by such exhaust products and will radiate heat back into the structure from which the products of combustion are being exhausted.

Another object of this invention is to provide a heat absorbing unit which may be placed in the connections of an open-hearth gas regenerator to the exhaust stack which will absorb heat from the gas on its way to the exhaust stack and which will radiate such heat back into the regenerator.

Another object of the invention is to provide a heat conserving unit for furnace exhaust flues which is provided with a plurality of heat absorbing elements operating to define a tortuous path through which the exhaust gases must flow in their movement to the atmosphere so as to facilitate the heating of such elements by the exhaust gases and to enable the radiation of heat by such elements back into the structure from which the gases are being exhausted.

Other objects and advantages of the invention will become apparent from the following description.

In the drawings, there is illustrated a preferred embodiment of the invention. In this showing:

Figure 1:
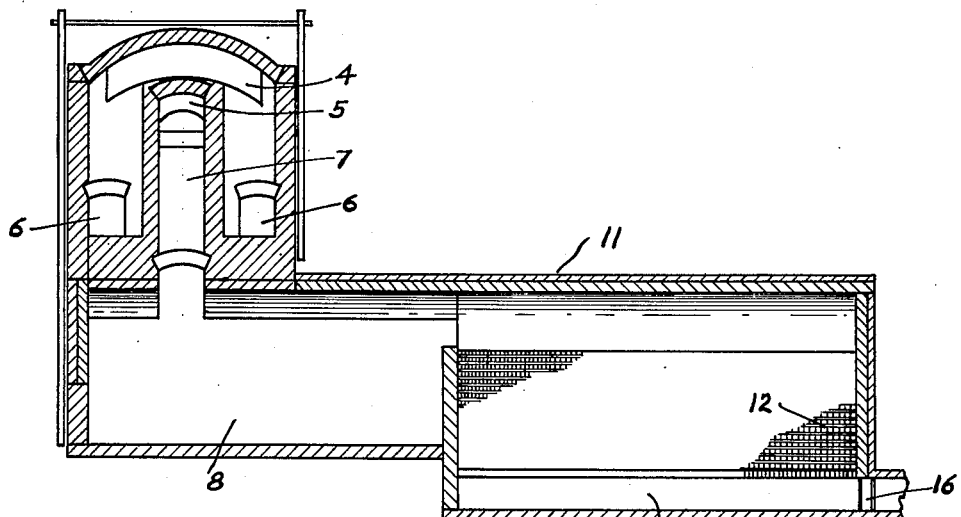
Fig. 1 is a vertical sectional view of a typical open-hearth furnace in a plane extending through the regenerator structure thereof, the view being a generally schematic view.
Figure 2:
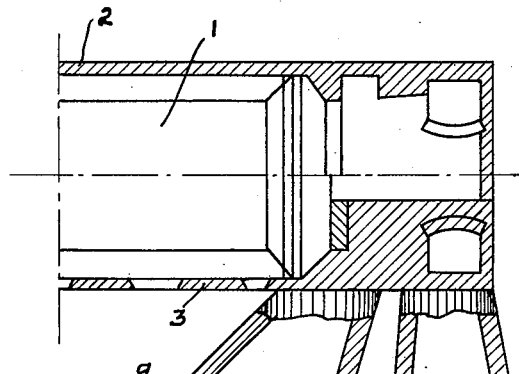
Fig. 2 is a fragmentary horizontal sectional view of the furnace structure shown in Fig. 1 illustrating the arrangement of the regenerator structure with respect to the furnace proper, the view being turned at right angles to Fig. 1 and the plane of the section being at different levels, the view being a generally schematic view.
Figure 2:
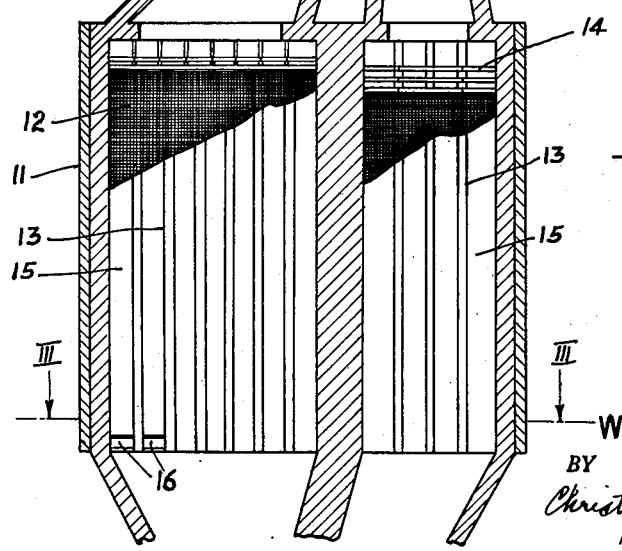
Figure 3:
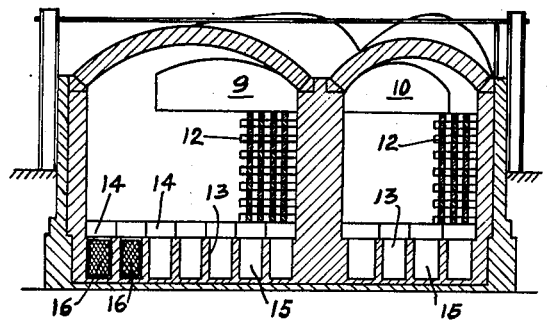
Fig. 3 is a vertical sectional view taken substantially in the plane of the line III—III of Fig. 2.

In Figs. 1 through 3 of the drawings, there is shown a typical open-hearth furnace which comprises a furnace part 1 having a tapping side 2, a charging side 3, and air and gas ports 4 and 5 at each end thereof connected respectively with air flues 6 and a gas flue 7. The flues 6 and 7 lead downwardly into separate chambers, such as at 8, which provide slag pockets in which slag carried out of the furnace by the burning gases may collect, and which are connected with air and gas flues 9 and 10 as indicated in Fig. 2. The flues 9 and 10 are each connected with a heat regenerator structure 11 having brick checker-work 12 therein for absorbing heat from the products of combustion passing thereover. The checker-work 12 is built on a supporting structure comprising a plurality of refractory strips 13 extending longitudinally of the furnace and having transverse refractory members 14 extending transversely of the upper edges of the supporting strips 13. As best shown in Fig. 3, the strips 13 cooperate with the base of the regenerator and transverse members 14 to define a plurality of passage-ways 15 through which the products of combustion may flow to the stack after flowing through the brick checker-work 12. The structure thus far described is that of a typical open-hearth furnace and forms no part per se of this invention.

Generally speaking, the function of the regenerator 11 is to absorb heat from the products of combustion being exhausted from the furnace, and to give up such heat to the gas being fed to the furnace to support combustion therein after the flow of the gas through the furnace has been reversed. The products of combustion being exhausted from the furnace give up heat to the brick checker-work 12 by a combined convecting and radiating action. Notwithstanding the heat given up to the brick checker-work 12, the exhaust flue gases leaving the terminal ends of the passageways 15 have an undesirably high temperature. In order to utilize some of the heat which is now exhausted to the atmosphere through the escaping flue gas, each of the exhaust passage-ways 15 is provided with a heat conserving unit, indicated as a whole by the numeral 16, at the terminal end of such passage-way or at its point of connection to the exhaust flue. Fig. 3 shows only two of the exhaust passage-ways 15 provided with heat conserving units 16 mounted therein, but it will be understood that all of the passageways in practice will have a unit 16 mounted therein. Generally speaking, the function of each unit 16 is to absorb heat from the exhaust gases mainly by convection and to radiate heat back in a direction opposite to that in which the exhaust gases are flowing. In this manner, the units 16 radiate heat back into the regenerator structure 11 which heat would be otherwise dissipated in the atmosphere. The heat radiated back into the regenerator chamber is of course absorbed by the structure of the regenerator chamber, which will thereafter give up its heat when the flow of gas through the open-hearth is reversed. Although the units 16 are provided in the exhaust passageways 15 of an open-hearth furnace it will be understood that this represents the preferred example of practicing the invention and that the invention is equally applicable to other types of furnaces in which heat is lost to the atmosphere through escaping flue gases.

The conserving units 16 provide a special action when employed in combination with the regenerator structure of an open-hearth furnace. This action will be best understood by considering first the conventional operation of a typical regenerator. The products of combustion flow downwardly over and through the brick checker-work in a typical regenerator, and in so doing, heat the checker-work, the temperature of the brick decreasing progressively from the top of the checker-work with the lowest brick temperature at the bottom. There are practical limits to the height of the checker-work since increases in height beyond a certain point will not operate to materially increase the temperature to which the incoming gases are heated upon reversal of flow through the generator. Although the temperature of the exhaust gases going to the stack may be reduced by such an increase in height, the additional heat absorbed from the exhaust gases is lost by conduction due to the large mass of material in contact with the ground over a large area. However, by increasing the temperature of the bricks in the checker-work, particularly those at the bottom, the temperature to which the incoming gases are raised upon reversal of flow is increased. This action is accomplished by the heat conserving units 16 of this invention. The heat radiated back by the units 16 is absorbed by the furnace structure defining the passageways 15, and the temperature of such structure is increased. This structure in turn radiates the heat upwardly into the checker-work to elevate the temperature of the bricks, particularly those at the bottom of the checker-work. Consequently, when the flow is reversed, the cold gas flowing through the checker-work has its temperature elevated above that which would be reached by the use of a regenerator without the use of the units 16. The units 16 thus are effective to make a given regenerator more efficient without any change in the structure of the regenerator itself.

Figure 6:
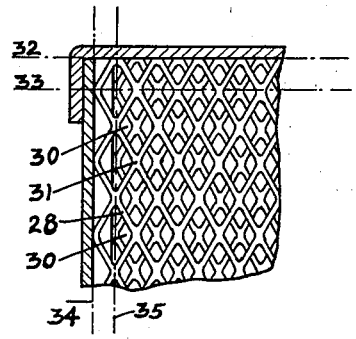
Fig. 6 is a fragmentary sectional and elevational view of a portion of one of the heat conserving units illustrating the staggered arrangement of the heat absorbing and radiating screens therein.
Figure 4:
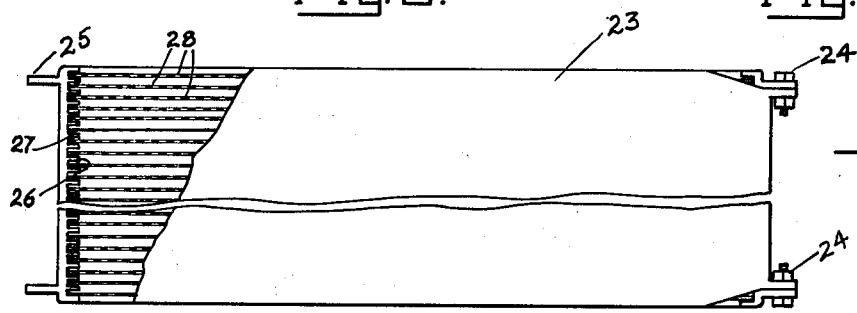
Fig. 4 is an enlarged and fragmentary top plan view of one of the heat recovery or conserving units provided in the structure illustrated in the preceding figures; a portion of the unit being broken away centrally thereof, a portion of the top being broken away at the left thereof to expose the parts underneath.
Figure 5:
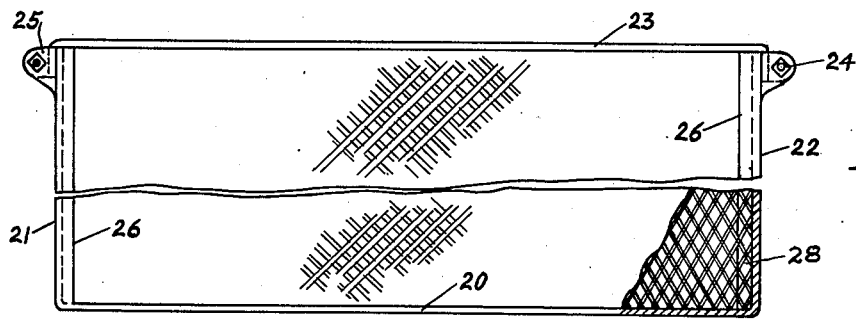
Fig. 5 is a side elevational view of the housing of the unit shown in Fig. 4, a portion of the unit being broken away and shown in section to illustrate the manner in which one of the radiating screens is mounted in position.

The preferred structure of the heat recovery units 16 is shown in Figs. 4 through 6. From this showing, it will be noted that each of the units 16 comprises a casing having a bottom 20 and side walls 21 and 22. The side wall 22 has a top 23 pivoted thereto at 24 and lugs 25 by which its other end may be secured to the side wall 21. The bottom 20, top 23, and side walls 21 and 22 define a rectangular opening substantially of the same area as that of the channels 15 through which the products of combustion must pass before being exhausted to the stack. As best shown in Fig. 4, the side walls 21 and 22 are provided with vertically extending members 26 defining a plurality of notches or vertically extending grooves 27 therebetween. The grooves 27 are adapted to receive the vertical edges of expanded metal screens 28 and form a mounting means for such screens. The expanded metal screens 28 are cut to size and are then slid into position with their vertical edges in the grooves 27 and lower edges resting on the bottom 20. The top 23 is then placed in position and the unit 16 is ready for mounting at the exhaust end of one of the passage-ways 15.

The expanded metal screens 28 are cut in such manner that the openings 30 therein are staggered transversely across the unit 16, as best shown in Fig. 6. For this purpose, it is preferred that the expanded metal screens be cut alternately across the apices 31 of the metal strips defining the openings 30 and extending along the horizontal lines 32 and 33. In a similar manner, the vertical edges of the screens 28 are formed by cutting alternately along the apices 31 positioned along the common vertical lines 34 and 35. With screens formed by cutting alternately along the lines 32 and 33 with respect to the lines 34 and 35, it is possible to stagger the openings 30 transversely of the unit 16 by the proper selection of the screens 28. The openings 30 will thus form a tortuous passageway across and through the unit 16 for the passage of the products of combustion therethrough. Such products of combustion in flowing through the unit 16 will flow over and around the metal in the screens 28 defining the openings 30 and will give up its heat to such openings by convection. The metal forming the screens 28 will thus become heated and the screens 28 adjacent the inner edge of the unit 16 will have their temperatures rapidly raised to a temperature substantially the same as that of the gas leaving the passage-way 15 while the screens 28 adjacent the exit side of the unit 16 will have progressively lower temperatures. The surface of the metal facing in the direction from which the exhaust gases are coming will radiate heat back against the direction of travel of such exhaust gases. Such radiated heat will be absorbed by the structure defining the passage-ways 15 and will be thus conserved until such time as the flow of gas through the regenerator is reversed. When the flow of gas through the regenerator is reversed, the heat in the metal screens provided in the unit 16 will be given up to the gases being fed to the furnace in the same manner that the heat in the brick of the checker-work 12 is given up to such gases.

In a typical open-hearth furnace, the passageways 15 will have a width of somewhat less than two feet and a height of somewhat over two feet. For this size opening it is preferred to employ one-half inch to three-fourths inch expanded metal screening, such screening having openings 30 with a width of from one-half inch to three-fourths inch along the horizontal lines 32 or 33, the strips of metal defining such openings being approximately one-eighth inch across. In such a unit, the lugs 26 are spaced apart a distance of approximately one-half inch, and preferably, there are provided about forty notches or grooves 27 in each of the sides 21 and 22 so as to accommodate about forty screens 28 positioned transversely of each of the units 16. However, it will be understood that various shapes and sizes of screens may be used in accordance with the type of expanded metal available for the construction of the heat conserving units and the requirements of the particular furnace for which the units are designed. Regardless of the particular manner in which the heat conserving units 16 are constructed, it will be found desirable to have a staggered arrangement of the openings 30 to thereby define a tortuous passage for the flow of gas and thus increase the amount of heat given up by such gas to the expanded metal screens in the unit 16.

Figure 7:
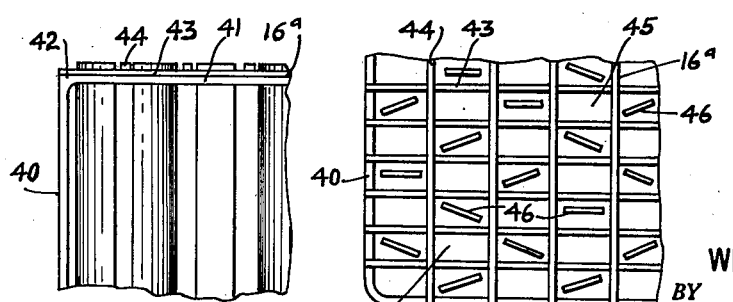
Fig. 7 is a fragmentary elevational view of a modified form of heat absorbing and radiating unit.
Figure 8:
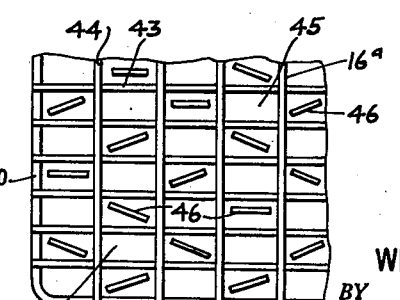
Fig. 8 is a fragmentary top plan view of the modified structure shown in Fig. 7.

If desired, the heat conserving units may be constructed by the use of members capable of radiating heat other than expanded metal screening 28 as, for example, in the modified structure shown in Figs. 7 and 8. Referring to this structure, the numeral 40 indicates a side wall of a unit 16a similar to the side wall 21 of the unit 16. The side wall (not shown) of the unit 16a opposite that of the side wall 40 is connected with the side wall 40 by transversely extending members 41 at the front and rear edges of the unit 16a. A lattice work is constructed along the upper edge 42 of the members 40 and 41 by the provision of a plurality of strips 43 mounted parallel to the members 41 and having their ends respectively secured by welding to the top edges 42 of the side walls 40. A plurality of strips 44 are mounted on the strips 43 at right angles thereto and are secured thereto as by welding. The lattice work comprised of the strips 43 and 44 define a plurality of openings 45 for the reception of elongated metal strips 46 which are inserted endwise through the openings 45. A similar lattice work (not shown) is provided at the base of the unit 16a for holding the lower ends of the strips 46. As best shown in Fig. 8, the strips 46 are inserted in alternate openings 45 so that the strips 46 will operate to define a tortuous or zig-zag path for the flow of gas through the unit 16a. In this manner, the strips 46 will be heated by the gas flowing thereover and will radiate heat back into the structure defining the passageways 15 in the same manner as described in connection with the unit 16.

Figure 9:
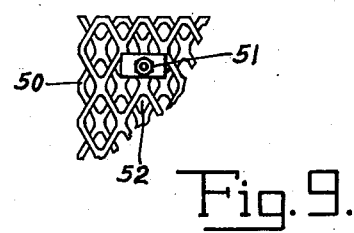
Fig. 9 is a fragmentary elevational view of a portion of another type of heat conserving unit.

Another type of heat conserving unit is shown in Figure 9. That unit is made of an appropriate number of layers, say twenty to forty, of expanded metal screening 50 such as used in the already-described unit. The layers of metal are slightly crimped so that some portions of the surface of each layer projects slightly above the general plane of the sheet. The layers are secured together by means of metal bolts 51, spaced at intervals and passing through the openings 52. The unit is of such size that it may be tightly jammed into the passageway 15 where sheets will be held in position by friction of the cut edges with the walls of the passageway.

From the foregoing, it will be seen that there is provided structure which will absorb heat from the exhaust gases flowing out of the exhaust opening in a furnace structure and will radiate such heat back into the furnace structure. Moreover, it will be noted that the units 16 are effective to prevent the direct radiation of heat out of a furnace. In the case of a furnace, such as an open-hearth furnace, where the gases are periodically reversed in flowing through the furnace, the heat absorbing unit will be effective to give up heat to the gases flowing into the furnace when the opening in which it is mounted becomes the inlet opening for gas entering the furnace. The provision of a heat recovery unit, such as the unit 16 and 16a in the exhaust opening of a furnace, will be found, by reason of preventing direct radiation of heat out of the furnace and in radiating heat back into a furnace, to effect a material saving of fuel in the operation of the furnace, and the exhaust gases in the stack of the furnace will be found to have a temperature less than that of a furnace in which the units 16 are not provided.

While I have illustrated and described one specific embodiment of my invention, it will be understood that this is merely by way of illustration, and that various changes and modifications may be made therein within the contemplation of my invention and under the scope of the following claim.

I claim:

In a regenerative heat recovery apparatus having a checker chamber and a flue, the invention comprising a plurality of reticulated baffle elements of relatively thin high temperature resistant sheet metal located in the flue adjacent the checker chamber and extending crosswise of the flue, the openings in the successive reticulated baffles being staggered relative to one another whereby gases may flow therethrough but a barrier is provided against direct radiation of heat, said metal baffles having a relatively small mass in proportion to their surface area so that they may quickly heat and cool.

WILLIAM E. SCHMERTZ.

References Cited in the file of this patent

UNITED STATES PATENTS

| Number | Name | Date |
| --- | --- | --- |
| 1,531,648 | Dyrssen | Mar. 31, 1925 |
| 1,915,880 | Carrigan | June 27, 1933 |
| 1,978,191 | Forter | Oct. 23, 1934 |
| 2,171,353 | Brassert | Aug. 29, 1939 |
| 2,185,559 | Mohr et al. | Jan. 2, 1940 |
| 2,259,913 | Walters | Oct. 21, 1941 |
| 2,492,788 | Dennis | Dec. 27, 1949 |

FOREIGN PATENTS

| Number | Country | Date |
| --- | --- | --- |
| 516,065 | France | Dec. 2, 1920 |
| 885,596 | France | May 31, 1943 |